A. ZÄHRINGER.
BALL AND SOCKET JOINT.
APPLICATION FILED DEC. 3, 1910.
1,079,531. Patented Nov. 25, 1913.
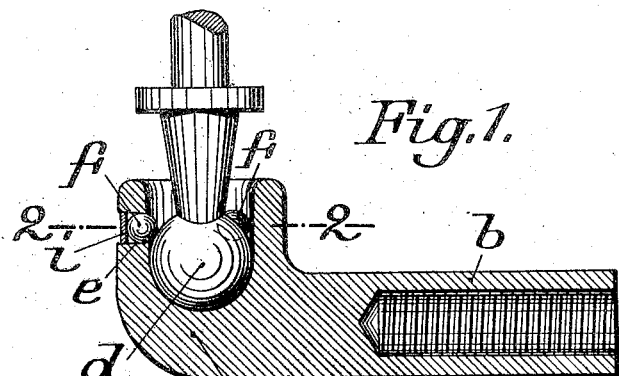
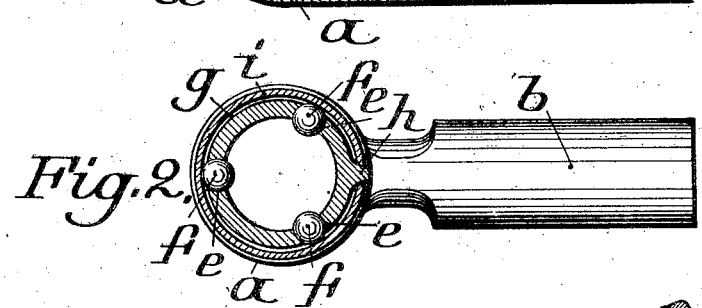
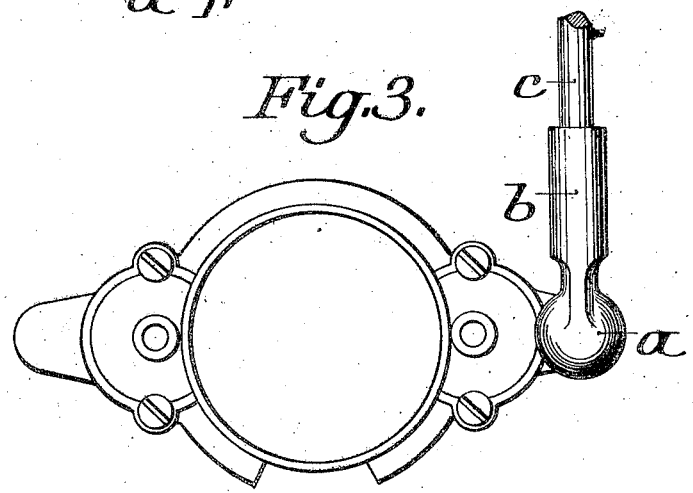
WITNESSES
INVENTOR
Arnold Zähringer

UNITED STATES PATENT OFFICE.

ARNOLD ZÄHRINGER, OF STUTTGART, GERMANY, ASSIGNOR TO THE FIRM OF ROBERT BOSCH, OF STUTTGART, GERMANY.

BALL-AND-SOCKET JOINT.

1,079,531.   Specification of Letters Patent.   Patented Nov. 25, 1913.

Application filed December 3, 1910. Serial No. 595,373.

*To all whom it may concern:*

Be it known that I, ARNOLD ZÄHRINGER, a subject of the Emperor of Germany, residing at Stuttgart, Germany, have invented certain new and useful Improvements in Ball-and-Socket Joints; and I do hereby declare the following to be a full, clear, and exact description of the invention, such as will enable others skilled in the art to which it appertains to make and use the same.

The invention relates to a ball and socket joint especially adapted to connect a drawrod with the adjusting lever of a mechanical interrupter of an electric sparking machine for the ignition of combustion engines.

The improvement consists in holding the ball-end portion of the joint in place by balls which are freely rotatable in all directions in radial passages in the socket and which are pressed inwardly against the ball-end by a spring.

In the accompanying drawing illustrating the preferred embodiment of my invention, Figure 1 is a longitudinal section through the ball and socket joint. Fig. 2 is a section on the line 2—2 of Fig. 1, with the ball-end of the interrupter lever removed. Fig. 3 shows in outline the capsule containing the interrupter, the draw-rod used for the adjustment, and the ball and socket joint connecting the two.

The socket $a$ is provided with a projection $b$ for attachment to the draw-rod $c$. The socket has a ball-shaped recess, which receives the ball-end $d$ of the interrupter lever. At the periphery of the socket $a$, I have shown three radial passages $e$ each having a gradually decreasing bore inwardly; however I may provide one or any other convenient number of passages and any number of balls in each passage. In each of the three passages $e$ lies a small ball $f$ whose diameter is such that the ball is freely rotatable in all directions, but cannot pass through the narrower part into the interior of the socket. At the outer periphery of the socket a flat groove $g$ is reamed out in the plane of the passages $e$, and preferably all around the socket excepting at the point $h$. In this annular groove is laid a plate spring $i$ bent in the form of a ring so as to press the balls $f$ inwardly against the ball-end $d$. These balls $f$ therefore press upon the ball-end $d$ of the interrupter lever and retain it in the socket. Furthermore the balls materially minimize the friction at the joint because they rotate freely and therefore roll upon the ball-end of the interrupter lever when the draw-rod is moved. It is possible to make the passages of constant bore throughout, as the balls will be retained therein by the spring on one side and by the ball-end of the joint on the other, but then the balls have to be inserted after the ball-end $d$ is in place. Also, I may modify the form of the spring shown, and may provide a spring for each passage, as will be readily understood.

Having thus described my invention, what I claim is:

1. A readily disengageable ball and socket joint, comprising a ball end, a socket for the ball end having a radial passage of decreasing bore toward the ball end and arranged beyond the maximum diameter of the ball end when the latter is in place in the socket, a ball in said passage having a diameter less than the outer diameter of the bore and greater than the inner diameter of the bore, and a spring pressing the ball against the ball end so as to hold the latter in place in the socket in such manner as to allow disengagement thereof from the socket; substantially as described.

2. A readily disengageable ball and socket joint, comprising a ball end, a socket for the ball end, having a plurality of radial passages of decreasing bore toward the ball end and arranged beyond the maximum diameter of the ball end, a ball in each of said passages having a diameter less than the outer diameter of the bore and greater than the inner diameter of the bore, and a plate spring of ring form pressing all the balls against the ball end so as to hold the latter in place in the socket in such manner as to allow the disengagement thereof from the socket; substantially as described.

In testimony whereof I affix my signature, in presence of two witnesses.

ARNOLD ZÄHRINGER.

Witnesses:
  MAX ANSCHÜTZ,
  REINHOLD ELWERT.